United States Patent [19]

Scott et al.

[11] Patent Number: 4,668,553

[45] Date of Patent: May 26, 1987

[54] WRAP YARNS HAVING CRIMPED TEXTURED BINDER STRANDS AND PILE FABRICS FORMED THEREFROM AND ATTENDANT PROCESSES

[75] Inventors: Eddie W. Scott, Mebane; Nelson E. Sweezy, Charlotte, both of N.C.

[73] Assignee: Collins & Aikman Corporation, New York, N.Y.

[21] Appl. No.: 890,915

[22] Filed: Jul. 28, 1986

[51] Int. Cl.$^4$ .................. B32B 3/02; B32B 33/00
[52] U.S. Cl. .................... 428/92; 57/210; 57/227; 57/252; 156/72; 428/93; 428/94; 428/96; 428/97; 428/357; 428/377
[58] Field of Search ............ 428/92, 93, 94, 96, 428/97, 357, 377; 57/B210, 227, 252; 156/72

[56] References Cited

U.S. PATENT DOCUMENTS

| | | | |
|---|---|---|---|
| 4,018,042 | 4/1977 | Maag et al. | 57/144 |
| 4,028,874 | 6/1977 | Maag et al. | 57/144 |
| 4,267,864 | 5/1981 | Kocay | 139/420 R |
| 4,356,690 | 11/1982 | Minorikawa et al. | 57/210 |
| 4,484,433 | 11/1984 | Stahlecker et al. | 57/15 |

Primary Examiner—Marion C. McCamish
Attorney, Agent, or Firm—Bell, Seltzer, Park & Gibson

[57] ABSTRACT

A pile fabric is formed of interengaging ground yarns and cut pile tufts. The tufts are formed of wrap yarns extending upwardly from the ground yarns and forming the face of the fabric. Each of the wrap yarns comprises a body strand of untwisted staple fibers and a crimped textured binder strand which has extensible and retractable properties. In the wrap yarn, the binder strand is helically wrapped around the body strand in an axially extended and tensioned condition and is reduced in bulk compared to the condition the binder strand would assume when relaxed. When tufts formed of such wrap yarns are cut to form the face of a cut pile fabric, the binder strands retract and position themselves inwardly away from the face of the pile fabric so as to be hidden among the pile tufts and not visible. The retraction of the binder yarns and the appearance, hand and integrity of the resulting fabric can all be enhanced by various finishing processes.

31 Claims, 7 Drawing Figures

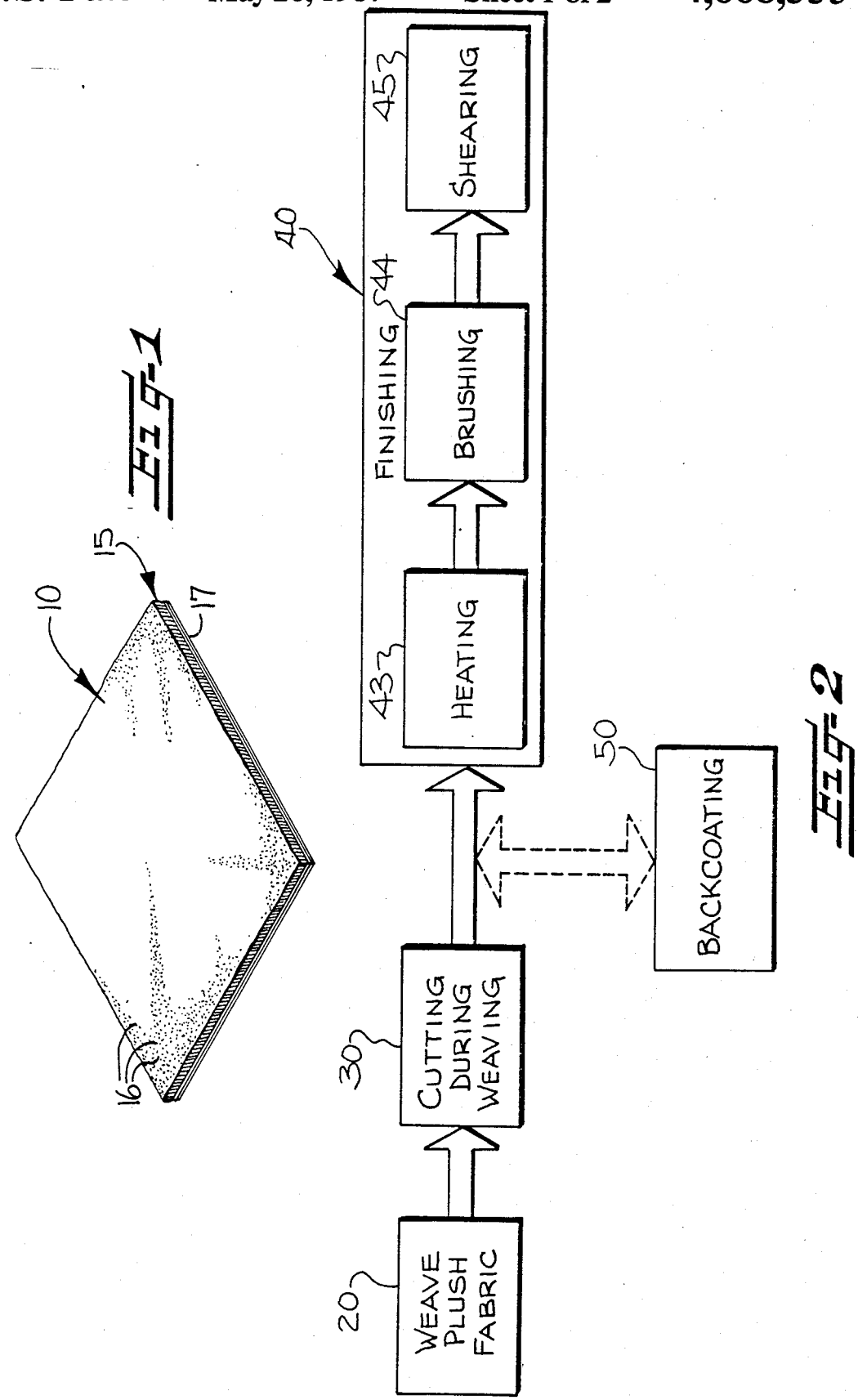

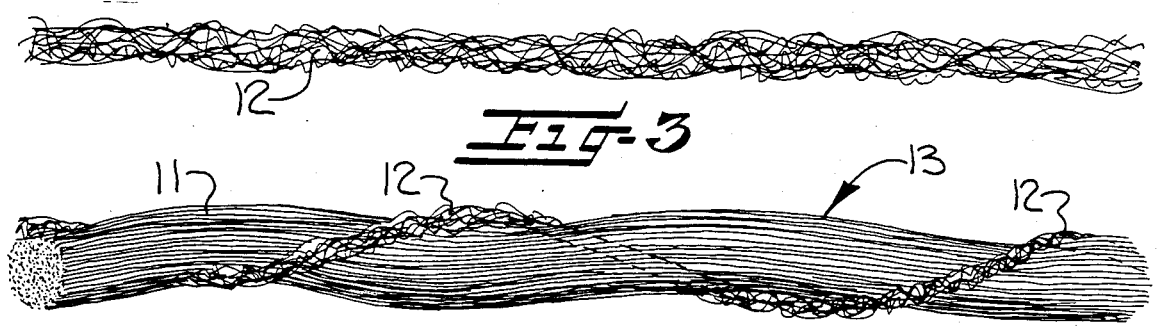
Fig-3
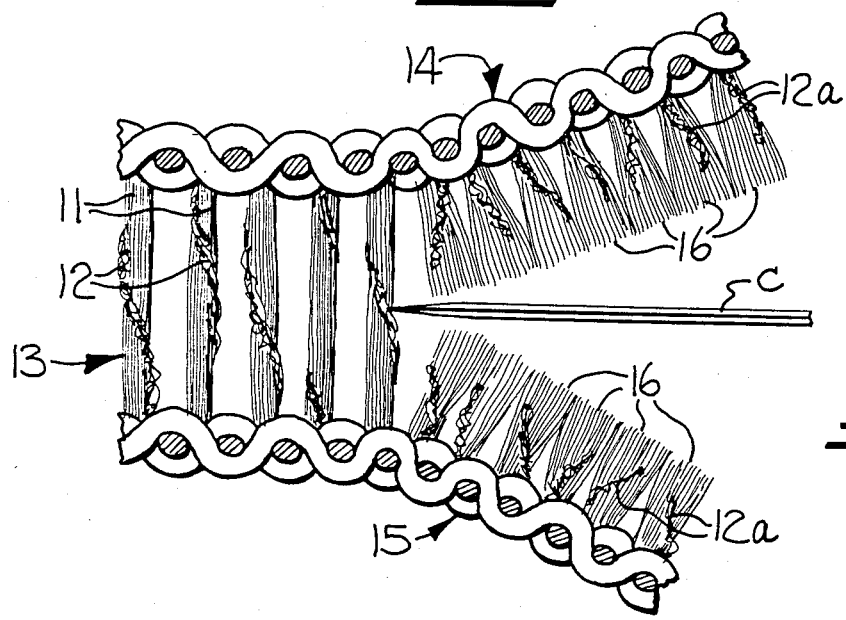
Fig-4
Fig-5
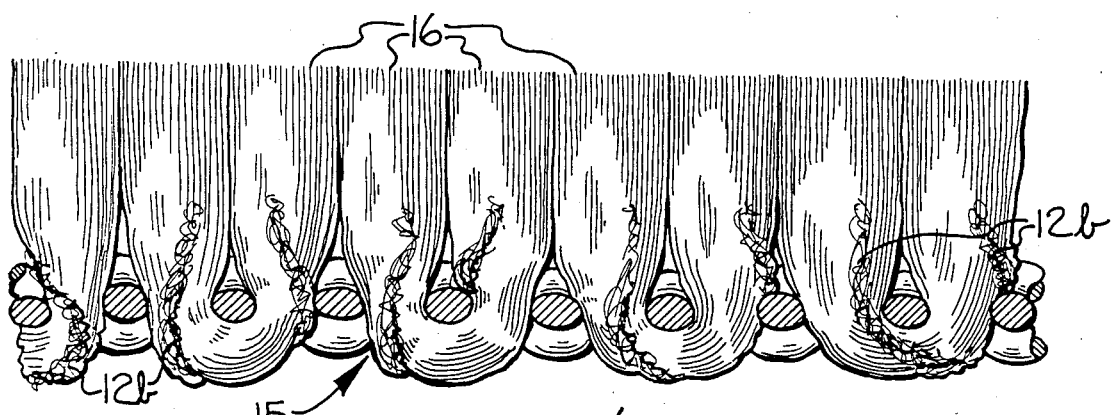
Fig-6
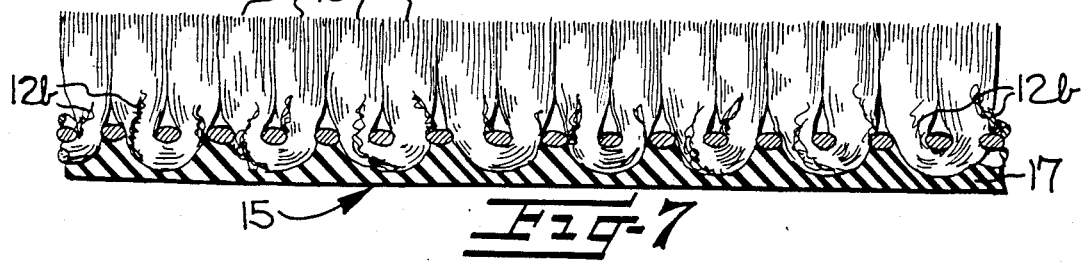
Fig-7

WRAP YARNS HAVING CRIMPED TEXTURED BINDER STRANDS AND PILE FABRICS FORMED THEREFROM AND ATTENDANT PROCESSES

This application is related to concurrently filed copending application Ser. No. 06/891,198, filed July 28, 1986 for "Wrap Yarns Having Low-Melt Binder Strands and Pile Fabrics Formed Therefrom and Attendant Processes". The present invention relates to the structure and manufacture of cut pile fabrics and to particular yarns used to make such fabrics.

BACKGROUND OF THE INVENTION

Cut pile fabrics have a variety of applications for which they are particularly suitable. As used herein, the term "cut pile fabric" refers to a fabric which comprises some sort of ground fabric into which are positioned upwardly facing cut pile tufts. A number of methods for producing such fabrics as well known and include cutting loop pile tufts to thereby produce cut pile or by plush weaving techniques wherein upper and lower ground fabrics are woven and are interconnected by pile yarns extending therebetween. By cutting the pile yarns between the two fabrics, a resulting cut pile face can be produced on each fabric.

One recent relatively widespread use of cut pile fabric has been in the manufacture of automotive upholsteries. In such applications, these fabrics are especially useful for seating surfaces as they are more comfortable to the touch in both hot and cold weather and have a rich appearance, feel and texture. Accordingly, improved production of such fabrics is currently commercially significant.

One method of forming cut pile fabrics suitable for the facing portions of automotive upholstery includes the use of "wrap yarns". As the name implies, a wrap yarn is formed by wrapping a binder strand, usually made up of one or more continuous synthetic filaments, around an untwisted body strand produced from staple fibers. Because the binder strand imparts structural integrity to the entire wrap yarn, twist is unnecessary in the body strand.

When used to form the upstanding pile portions of a cut pile fabric, wrap yarns provide good surface coverage and appearance. The untwisted characteristics of the body strands allow the cut faces of the staple fibers to spread apart to a greater degree and enhance their surface coverage.

Nevertheless, although suitable in certain upholstery applications, cut pile fabrics made from such wrap yarns also suffer from particular disadvantages characteristic of their nature and construction. The most serious problem arises from the differences between the fiber characteristics of the body strand and those of the binder strand. As stated earlier, the body strand is formed from staple fibers of particular individual or blended character and the binder strand is typically formed of continuous filaments of a different fiber having a different character. Accordingly, obtaining a consistent identical color for the binder and body strands is almost impossible even where the wrap yarn or fabric made from it is piece dyed. When such yarns are medium to dark colored yarns, the visible difference in color between the binder strands and the body strands is increasingly troublesome and quite apparent even though the binder strand makes up less than 10 percent of the total weight of the wrap yarn. The result can be described in textile jargon as a "salt and pepper" effect in which the differently colored or noncolored binder yarns appear on the face of the cut pile fabric. To date, however, no satisfactory solutions have existed for obtaining the desired coverage and texture of cut pile fabrics formed from wrap yarns while avoiding the accompanying aesthetic problems.

One attempt at eliminating the aesthetic problems associated with cut pile fabrics formed from such wrap yarns has been to include a flat monofilament binder strand as part of the wrap yarn. Generally speaking, such flat monofilament fibers are most often colorless and transparent and consequently are not visible on the face of a cut pile fabric the way less transparent textured multifilament binder strands are. Typical commercial multifilament strands often appear white. Nevertheless, because a monofilament binder strand will of necessity usually be larger than would be the individual filaments of a multifilament binder strand, the relatively large, and consequently stiffer binder yarn gives the resulting pile fabric a poor hand which is bristly or prickly to the touch.

It is thus an object of the present invention to provide a cut pile fabric formed from wrap yarns which includes the desired surface characteristics wrap yarns provide, but which overcomes the problems attendant to stiff and/or visible binder strands.

It is a further object of this invention to provide a cut pile fabric in which the binder strands are retracted inwardly from the face of the cut pile fabric so as to be hidden among the cut pile tufts and not visible on the face of the fabric.

It is a further object of this invention to provide a wrap yarn formed from a body strand and a binder strand of such characteristics that when included in a cut pile fabric, the binder strands will retract away from the face of the cut pile fabric and be hidden among the pile tufts and not visible at the face.

It is yet another object of the invention to provide a method of making a cut pile fabric having enhanced surface characteristics and a consistent asthetic appearance by forming a pile fabric from wrap yarns in which the binder strand is formed of a crimped textured filament with extensible and retractable properties and which is helically wrapped around the body strand in an axially extended fashion so that when the pile tufts formed from such yarns are cut to form the cut pile fabric face, the relaxation of the cut binder strand draws it inwardly away from the face of the cut pile fabric and keeps it hidden among the pile tufts.

It is a further object of the present invention to use the regular heating of fabric finishing treatment to enhance the retraction of such binder yarns inwardly away from the face of the cut pile fabric.

SUMMARY OF THE INVENTION

The present invention comprises a cut pile fabric formed of interengaging ground yarns, and cut pile tufts formed of wrap yarns interconnecting with the ground yarns and extending upwardly therefrom to form the face of the pile fabric. Each of the wrap yarns comprises a body strand of substantially untwisted staple fibers and a crimped textured binder strand which is helically wrapped around the body strand and has extensible and retractable properties. The binder strands are retractably positioned inwardly away from the cut face of the pile fabric so as to be hidden among the pile tufts and generally not visible on the face of the fabric.

The invention further comprises both the particular wrap yarn used to form the pile fabric as well as the method of forming the fabric. In this regard, the invention comprises forming an uncut pile fabric while utilizing wrap yarns for the piles thereof. Each of the wrap yarns comprises a body strand of untwisted staple fibers and a crimped textured binder strand having extensible and retractable properties. The binder strand is helically wrapped around the body strand in a tensioned condition so as to be axially extended and reduced in bulk compared to the condition the textured binder strand would assume when relaxed. By cutting the pile yarns, pile tufts are formed on the face of the fabric. Furthermore, cutting the pile yarns relaxes the tensioned condition of the binder strands and thereby causes the crimped textured binder strands to retract to a position inwardly from the cut face of the pile fabric.

The present invention also comprises applying heat to the face of such a cut pile fabric to cause the crimped textured binder strands of the pile tufts to retract further inwardly from the face, as well as other finishing processes which enhance the appearance and hand of the resulting fabric.

The foregoing and other objects, advantages and features of the invention, and the manner in which the same are accomplished will become more readily apparent upon consideration of the following detailed description of the invention taken in conjunction with the accompanying drawings, which illustrate preferred and exemplary embodiments, and wherein:

FIG. 1 is a perspective view of a portion of the finished cut pile fabric;

FIG. 2 is a schematic diagram of the preferred method of the invention and showing individual steps therein;

FIG. 3 is an enlarged schematic view of a typical crimped textured binder strand;

FIG. 4 is a schematic view of a wrap yarn formed from a staple fiber body strand and a crimped textured binder strand helically positioned therearound;

FIG. 5 is a schematic cross-sectional view of the preferred method of forming cut pile fabrics wherein upper and lower woven pile fabrics are formed by plush weaving techniques and wherein the wrap yarns of the present invention are utilized and showing the retraction of the wrap yarn binder strands upon cutting the pile yarns extending between the upper and lower fabrics;

FIG. 6 is a schematic cross-sectional view of a pile fabric according to the present invention and showing the retracted binder strands and the cut pile tufts formed from the body strands; and FIG. 7 is a schematic cross-sectional view similar to FIG. 6 but on a smaller scale, and showing a backcoating applied to the cut pile fabric.

DETAILED DESCRIPTION OF THE INVENTION

The present invention comprises a pile fabric formed from interengaging ground yarns and cut pile tufts formed of wrap yarns extending therefrom and forming the face of the fabric. Each of the wrap yarns comprises a body strand of untwisted staple fibers and a crimped textured binder strand having extensible and retractable properties. The binder strand is helically wrapped around the body strand and in the fabric, the binder strands are retractably positioned inwardly away from the cut face of the pile fabric so as to be hidden among the pile tufts and not visible.

A pile fabric of the type generally referred to as a "plush" fabric and formed according to the present invention is illustrated in FIG. 1 and broadly designated at 10. As discussed herein the tufts of the pile fabric 10 are formed from wrap yarns 13, an enlarged schematic view of which is best shown in FIG. 4. The wrap yarn 13 comprises a body strand 11 of untwisted staple fibers and a crimped textured multifilament binder strand 12 having extensible and retractable properties. Both the fibers of the body strand and the filaments of the binder strand may be predyed as desired, especially when making fabrics of medium to dark shades. As illustrated in FIG. 4, the binder strand 12 is helically wrapped around the body strand 11 in a tensioned condition so that the binder strand 12 is axially extended and reduced in bulk compared to the condition the binder strand would assume when relaxed.

An enlarged schematic view of such a crimped textured binder strand is illustrated in FIG. 3 and in preferred embodiments the crimped textured binder strand has been false twist crimped and textured, although any other method of producing crimped textured yarn is acceptable, such as stuffer box processes, edge-crimping, and knit-deknit techniques. According to the present invention, it has been found that polyamide materials, particularly nylon-6 and nylon-6,6 are especially suitable for forming the crimped textured binder strand 12 which has the extensible and retractable properties useful in the invention.

In these plush fabric embodiments, staple fibers of the body strand are preferably formed of synthetic fibers such as polyamide, polyester, polypropylene, or acrylic fibers, and typically are about two inches in length. If desired the staple fibers may be natural fibers such as wool or cotton for example. In such embodiments, the binder strands make up between about 3 of 10 percent by weight of the wrap yarn and in particular preferred embodiments between about 5 to 8 percent by weight of the wrap yarn. Expressed in sizes, preferred wrap yarns will have a binder strand of approximately 40 denier multifilament with 13 filaments each of about 3 denier and a staple fiber body strand of about a 10's count. The invention is not limited, however, to the production of plush fabrics but is useful in many other applications. For example, where it is desirable that a binder strand exhibit little or no sheen, a textured binder strand as a component of a wrap yarn would serve this purpose even if the textured binder strand had little or no extensibility or retractability. It will be understood that in such other applications the yarn sizes of both binder and body strand, and their proportional relationship to one another, can vary widely.

As illustrated in FIG. 2, the preferred method of making a pile fabric according to the present invention can comprise a number of steps. Overall, the invention comprises a method of making a pile fabric which comprises forming an uncut pile fabric which utilizes the wrap yarns of the present invention for the pile thereof. Cutting of the wrap yarns which make up the pile yarns forms pile tufts on the face of the fabric, relaxes the tensioned condition of the crimped textured binder strands, and causes the binder strands to retract to a position inwardly from the cut face of the pile fabric, as illustrated in FIG. 5.

One specific such method and the resulting fabrics are illustrated in FIGS. 5, 6, and 7. FIG. 5 shows a method of making a plush woven pile fabric according to the present invention by forming upper and lower woven ground fabrics 14 and 15, respectively, which utilize pile wrap yarns 13 extending between and interconnecting the upper and lower ground fabrics. As set forth earlier, each of the wrap yarns comprises a body strand 11 of untwisted staple fibers and a crimped textured binder strand 12 which has extensible and retractable properties. As seen in the left-hand portions of FIG. 5, the binder strands 12 are helically wrapped around the body strands 11 in a tensioned condition so as to be axially extended and reduced in bulk compared to the condition the crimped textured binder strand 12 would assume when relaxed, as illustrated in FIG. 3.

The upper and lower ground fabrics 14 and 15, respectively, are separated from one another by cutting the interconnecting pile yarns 13 therebetween with a cutter C, as specifically illustrated in FIG. 5. By so cutting the interconnecting pile yarns, pile tufts 16 are formed on the face of each of the separated pile fabrics. Furthermore, cutting the pile yarns relaxes the tensioned condition of the crimped textured binder strands 12, thereby permitting the binder strands to mechanically retract to a position inwardly from the face of the pile fabric to permit the upper portions of the body strands to expand. The cut and mechanically retracted binder strands are designated 12a in FIG. 5.

According to the present invention, cutting the wrap yarns 13 to form the pile tufts causes the cut binder strands 12a to retract inwardly a distance equivalent to about 25 percent of the height of the cut pile. As an example, typical plush fabrics have pile heights of between 3/16" and ¼".

It has been further discovered according to the present invention that applying heat to the pile fabric causes the cut binder strands 12a formed of preferred heat shrinkable materials such as nylon-6 and nylon-6,6 to retract further inwardly to about 50 percent of the height of the cut pile. This permits upper portions of the body strands to expand further and enhance the uniformity of the face of the pile fabric. In certain embodiments, the heating step causes the cut binder strands 12a to retract further inwardly a distance equivalent to between about 30 to 50 percent of the height of the cut pile. These further retracted binder strands are designated 12b in FIGS. 6 and 7.

In typical applications, heating the fabric can take place during finishing operations and in embodiments preferred for producing plush fabrics, the cut pile fabric passes through the steps of applying heat to the fabric, preferably at temperatures of about 230° F. or higher, brushing the pile of the thus heated fabric, and thereafter shearing the brushed pile fabric.

In the schematic diagram of FIG. 2, the weaving step is designated 20, the cutting step 30, the entire finishing step broadly as 40, the backcoating step as 50. Within the broad finishing step 40 are the individual steps of heating 43, then brushing 44 and shearing 45. It will be further understood that the particular finishing steps used according to the invention may differ, depending on the type of fabric being produced.

As indicated earlier, production of plush pile fabric also preferably includes backcoating. Given the nature of the wrap yarns, the pile fabric formed and the handling required prior to final finish of the fabric, the backcoating adds necessary structural integrity to the plush fabric. Typical backcoating materials found to be appropriate include low-melt thermoplastic adhesive polymers. It will be understood that in the production of other types of cut pile fabrics according to the present invention, other finishing techniques may be preferred which may or may not include certain of the specific steps found most suitable for plush pile fabrics.

Pile fabrics of the present invention produced according to the methods of the present invention, are best illustrated in the schematic enlarged views of FIGS. 6 and 7. As seen therein, the fabric of the present invention further comprises interengaging ground yarns 15 and cut pile tufts 16 formed from the wrap yarns 13 of the present invention. The cut pile tufts 16 extend from the ground yarns 15 and form the face of the fabric. Each of the wrap yarns 13 comprises a body strand 11 of untwisted staple fibers and a binder strand 12 helically wrapped around the body strand. Each binder strand 12 is formed of a heat shrinkable crimped textured thermoplastic material that shrinks and retracts when subjected to predetermined temperatures, preferably during the finishing treatment. The ground yarns 15 and the body strands 13 are formed of fibers which are unaffected by these predetermined temperatures so that the integrity of the ground yarns and staple fibers are not impaired during these treatments. Exposure to these predetermined temperatures causes the binder strands 12 to be retracted inwardly away from the cut face of the pile fabric and to be hidden among the tufts and not visible. In FIG. 7, backcoating 17 is illustrated as having been applied according to the preferred method step of the present invention.

It has also been determined according to the present invention that in certain pile fabric embodiments the mechanical cutting of the wrap yarns 13 and the retractable properties of the binder strands 12 cause the binder strand to retract an amount between about 15 to 30 percent of the height of the cut pile. Further, when various pile fabrics of the present invention are exposed to heat and raised to the predetermined temperatures, the binder strands retract further and become positioned inwardly of the cut face a distance equivalent to about 30 to 50 percent of the height of the cut pile.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A pile fabric comprising interengaging ground yarns and cut pile tufts formed of wrap yarns extending therefrom and forming the face of the fabric, each of said wrap yarns comprising a body strand of untwisted staple fibers and a crimped textured binder strand having extensible and retractable properties, said binder strand being helically wrapped around said body strand and wherein said binder strands are retractably positioned inwardly away from the cut face of the pile fabric so as to be hidden among the pile tufts and not to be visible.

2. A pile fabric according to claim 1 wherein each of said crimped textured binder strands is false twist texturized.

3. A pile fabric according to claim 1 wherein each of said crimped textured binder strands is a polyamide.

4. A pile fabric according to claim 1 wherein the staple fibers of said body strand are selected from the group consisting of: polyamide, polyester, polypropylene, and acrylic fibers.

5. A pile fabric according to claim 1 wherein each of said binder strands comprises between about 3 to 10 percent by weight of the wrap yarn.

6. A pile fabric according to claim 5 wherein said binder strands comprise between about 5 to 8 percent by weight of the wrap yarn.

7. A pile fabric according to claim 5 wherein said binder strands are positioned inwardly of the cut face of the pile fabric a distance equivalent to about 30 to 50 percent of the height of the cut pile.

8. A pile fabric according to claim 1 wherein said binder strands are positioned inwardly of the cut face of the pile fabric a distance equivalent to about 15 to 30 percent of the height of the cut pile.

9. A pile fabric according to claim 1 wherein said binder strands have a size of approximately 40 denier and said staple fiber body strands are about 10's count.

10. A pile fabric according to claim 1 wherein said interengaging ground yarns comprise a woven fabric.

11. A pile fabric comprising interengaging ground yarns and cut pile tufts formed from wrap yarns and extending from the ground yarns and forming the face of the fabric, each of said wrap yarns comprising a body strand of untwisted staple fibers and a multifilament binder strand helically wrapped around said body strand, each binder strand being formed of a heat shrinkable crimped textured thermoplastic material that shrinks and retracts when subjected to a predetermined temperature, said ground yarns and said body strand being formed of fibers unaffected by said predetermined temperature so that the integrity of said ground yarns and staple fibers is not impaired thereby, said binder strands having been heated to said predetermined temperature so as to cause the binder strands to be retracted inwardly away from the cut face of the pile fabric so as to be hidden among the pile tufts and not to be visible.

12. A pile fabric comprising interengaging ground yarns and cut pile tufts formed of wrap yarns extending therefrom and forming the face of the fabric, a backcoating overlying the backside of the interengaging ground yarns and the lower bights of the pile tufts to aid in securing the pile tufts in the pile fabric, each of said wrap yarns comprising a body strand of untwisted staple fibers and a crimped textured binder strand having extensible and retractable properties, said binder strand being helically wrapped around said body strand and wherein said binder strands are retractably positioned inwardly away from the cut face of the pile fabric so as to be hidden among the pile tufts and not to be visible.

13. A wrap yarn adapted to be used for forming pile in a cut pile fabric and comprising a body strand formed of untwisted staple fibers and a crimped textured binder strand having extensible and retractable properties, said binder strand being helically wrapped around said body strand in a tensioned condition so as to be axially extended and reduced in bulk compared to the condition the binder strand would assume when relaxed.

14. A wrap yarn according to claim 13 wherein said crimped textured binder strand is false twist textured.

15. A wrap yarn according to claim 13 wherein said crimped textured binder strand is a polyamide.

16. A wrap yarn according to claim 13 wherein the staple fibers of said body strand are selected from the group consisting of: polyamide, polyester, polypropylene, and acrylic fibers.

17. A wrap yarn according to claim 13 wherein said binder strand comprises between about 3 to 10 percent by weight of said wrap yarn.

18. A wrap yarn according to claim 13 wherein said binder strand has a size of approximately 40 denier and said staple fiber body strand is about a 10's count.

19. A wrap yarn adapted to be used for forming various types of fabric including pile in a cut pile fabric and comprising a body strand formed of untwisted staple fibers and a textured multifilament binder strand helically wrapped around said body strand.

20. A method of making a pile fabric, comprising:
(a) forming an uncut pile fabric utilizing wrap yarns for the pile thereof, and wherein each of the wrap yarns comprises a body strand of untwisted staple fibers and a crimped textured binder strand having extensible and retractable properties, said binder strand being helically wrapped around said body strand in a tensioned condition so as to be axially extended and reduced in bulk compared to the condition the textured binder strand would assume when relaxed; and
(b) cutting the pile yarns so as to form pile tufts on the face of the fabric, said cutting of the pile yarns relaxing the tensioned condition of said crimped textured binder strands, thereby causing the binder strands to retract to a position inwardly from the cut face of the pile fabric.

21. A method according to claim 20 including backcoating the fabric, and then passing the backcoated fabric through a finishing operation, and wherein the finishing operation includes applying heat to the fabric, brushing the pile of the heated fabric and shearing the brushed pile fabric.

22. A method of improving the hand and/or appearance of the face of a cut pile fabric in which the pile tufts are formed of wrap yarns, and wherein each wrap yarn comprises a body strand formed of untwisted staple fibers and a crimped textured binder strand having extensible and retractable properties, and being helically wrapped around the body strand, said method comprising: applying heat to the pile fabric so as to cause the binder strands of the pile tufts to retract inwardly in a direction away from the face of the pile fabric so as to permit upper portions of the body strands to expand and enhance the uniformity of the face of the pile fabric.

23. A method according to claim 22 including brushing the pile of the fabric following the step of applying heat thereto, and then shearing the pile face of the fabric.

24. A method according to claim 22 including the further step of applying a backcoating to the pile fabric.

25. A method according to claim 22 including passing the fabric through a finishing operation which includes said step of applying heat to the pile fabric, and further includes brushing the pile of the heated fabric, and shearing the brushed pile fabric.

26. A method of making a woven pile fabric, comprising:
(a) forming upper and lower woven ground fabrics while utilizing pile wrap yarns extending between and interconnecting the upper and lower ground fabrics and wherein each of the wrap yarns comprises a body strand of untwisted staple fibers and a crimped textured binder strand having extensible and retractable properties, the binder strand being helically wrapped around the body strand in a tensioned condition so as to be axially extended and reduced in bulk compared to the condition the crimped textured binder strand would assume when relaxed; and (b) separating the upper and lower ground fabrics from one another by cutting the interconnecting pile yarns between the upper and lower ground fabrics so as to form pile tufts on the face of each of the separated pile fabrics, said cutting of the pile yarns relaxing the tensioned condition of the crimped textured binder strands, thereby causing the binder strands to retract to a position inwardly from the cut face of the pile fabric.

27. A method according to claim 26 further comprising applying heat to the separated fabrics so as to cause the binder strands of the pile tufts to retract further inwardly from each respective face of the pile fabrics.

28. A method according to claim 27 wherein the step of applying heat to the separated fabrics comprises directing the respective fabrics through a heated tenter frame.

29. A method according to claim 27 wherein the step of applying heat to the respective fabrics comprises exposing the respective faces of the fabrics to temperatures of at least about 230° F.

30. A method according to claim 26 further comprising applying heat to cause the binder strands of the pile tufts to retract inwardly a distance equivalent to about 30 to 50 percent of the height of the cut pile.

31. A method according to claim 26 wherein the tension of the binder strands and the crimp texturing thereof are such as to cause the binder strands to retract inwardly a distance equivalent to about 15 to 30 percent of the height of the cut pile.

* * * * *

UNITED STATES PATENT AND TRADEMARK OFFICE
CERTIFICATE OF CORRECTION

PATENT NO. : 4,668,553

DATED : May 26, 1987

INVENTOR(S) : Eddie W. Scott and Nelson E. Sweezy

It is certified that error appears in the above-identified patent and that said Letters Patent is hereby corrected as shown below:

Column 7 Line 7, delete "5" and insert; --1--

Signed and Sealed this

Seventeenth Day of November, 1987

Attest:

DONALD J. QUIGG

Attesting Officer

Commissioner of Patents and Trademarks